(12) United States Patent
Choi et al.

(10) Patent No.: US 7,592,086 B2
(45) Date of Patent: Sep. 22, 2009

(54) POLYMER MEMBRANE, METHOD OF PREPARING THE SAME, AND FUEL CELL USING THE SAME

(75) Inventors: Yeong suk Choi, Suwon-si (KR); Tae Kyoung Kim, Seoul (KR); Won mok Lee, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 297 days.

(21) Appl. No.: 11/443,161

(22) Filed: May 31, 2006

(65) Prior Publication Data

US 2007/0166621 A1 Jul. 19, 2007

(30) Foreign Application Priority Data

Jan. 19, 2006 (KR) .................. 10-2006-0005841

(51) Int. Cl.
*H01M 8/10* (2006.01)
*H01M 6/14* (2006.01)
(52) U.S. Cl. .......................... 429/33; 429/303
(58) Field of Classification Search ................ 429/309, 429/33
See application file for complete search history.

(56) References Cited

U.S. PATENT DOCUMENTS 4,200,538 A 4/1980 Seita et al.
5,425,865 A * 6/1995 Singleton et al. ............ 204/252
2004/0241519 A1 12/2004 Howard
2005/0100772 A1 5/2005 Ono

FOREIGN PATENT DOCUMENTS

| JP | 51-126998 | * 11/1976 |
| JP | 63-306026 | 12/1988 |
| JP | 2002-083514 | 3/2002 |
| JP | 2002-46089 | * 5/2002 |
| JP | 2002-146089 | 5/2002 |

OTHER PUBLICATIONS

Office Action issued by Japanese Patent Office in Japanese Patent Application No. 2006-152593 on Jun. 17, 2008.

* cited by examiner

*Primary Examiner*—Patrick Ryan
*Assistant Examiner*—Thomas H. Parsons
(74) *Attorney, Agent, or Firm*—Stein McEwen, LLP

(57) ABSTRACT

Provided are a polymer membrane that includes a porous polymer matrix and an acryl-based polymer infiltrated in pores of the porous polymer matrix, a method of preparing the same, and a fuel cell using the polymer membrane. The polymer membrane effectively decreases a crossover phenomenon of a fuel cell.

19 Claims, 6 Drawing Sheets

POLYMER MEMBRANE, METHOD OF PREPARING THE SAME, AND FUEL CELL USING THE SAME

CROSS-REFERENCE TO RELATED APPLICATION

This application claims the benefit of Korean Patent Application No. 2006-5841, filed on Jan. 19, 2006 in the Korean Intellectual Property Office, the disclosure of which is incorporated herein in its entirety by reference.

BACKGROUND OF THE INVENTION

1. Field of the Invention

Aspects of the present invention relate to a polymer membrane, a method of preparing the same, and a fuel cell using the polymer membrane, and more particularly, to a polymer membrane capable of effectively decreasing crossover in a fuel cell by infiltrating pores of a porous polymer matrix with an acryl-based polymer, a method of preparing the same, and a fuel cell using the polymer membrane.

2. Description of the Related Art

Fuel cells generate electrochemical energy by reacting fuel and oxygen and are used as electric power sources for industrial use, domestic use, vehicles, and small electric/electronic applications, such as portable devices, etc.

Fuel cells can be categorized into polymer electrolyte membrane fuel cells (PEMFCs), phosphoric acid fuel cells (PAFCs), molten carbonate fuel cells (MCFCs), solid oxide fuel cells (SOFCs), etc., according to the electrolyte that is used. These fuel cells have different operating temperatures and include different constituting material, according to the electrolyte that is used.

According to the method of supplying fuel to an anode, fuel cells can be categorized into external modification type fuel cells, in which fuel is supplied to an anode after being converted into hydrogen-rich gas by a fuel modifier, and direct fuel supply type or internal modification type fuel cells, in which gaseous or liquid fuel is directly supplied to an anode.

Direct methanol fuel cells (DMFCs) are a kind of direct fuel supply type fuel cells. In general, a DMFC includes an aqueous methanol solution as fuel and a proton conductive polymer electrolyte membrane as an electrolyte. Accordingly, DMFCs also belong to the group of PEMFCs.

PEMFCs can exhibit high power output density even when they are small and lightweight. Furthermore, an energy generating system can be simply constructed using a PEMFC.

In general, a basic structure of a PEMFC includes an anode (fuel electrode), a cathode (oxidant electrode), and a polymer electrolyte membrane interposed between the anode and the cathode. The anode of the PEMFC includes a catalyst layer that promotes oxidation of fuel, and the cathode of the PEMFC includes a catalyst layer that promotes reduction of an oxidant.

Fuel that is supplied to the anode of the PEMFC can be hydrogen, a hydrogen-containing gas, a mixed gas of methanol and water, an aqueous methanol solution, etc. An oxidant that is supplied to the cathode of the PEMFC can be oxygen, an oxygen-containing gas, or air.

In the anode of the PEMFC, fuel is oxidized and thus generates protons and electrons. The generated protons are transported to the cathode through the electrolyte membrane, and the generated electrons are transported to an external circuit (load) through a conductive line (or current collector). In the cathode of the PEMFC, protons transported through the electrolyte membrane, electrons transported from the external circuit through the conductive line (or current collector), and oxygen are combined together to generate water. Meanwhile, the flow of electrons from the anode to the cathode through the external circuit produces electrical power.

The polymer electrolyte membrane of the PEMFC acts as an ion conductor that allows protons to move from the anode to the cathode and also as a separator that mechanically separates the anode from the cathode. Accordingly, desired properties of the polymer electrolyte membrane include excellent ion conductivity, electrochemical stability, high mechanical strength, thermal stability at operating temperatures, ease of thin film formation, etc.

A polymer electrolyte membrane is typically formed of a polymer electrolyte, such as a perfluoro sulfonated polymer (for example, NAFION (Dupont Inc.)) that has a main chain of fluorinated alkylene and a side chain of fluorinated vinyl ether terminated with a sulfonic acid group. Such a polymer electrolyte membrane exhibits excellent ion conductivity by containing an appropriate amount of water.

However, since the polymer electrolyte membrane has a channel of a large diameter within an ionomer cluster, the crossover rate of fuel (that is, the rate at which fuel crosses through the membrane from the anode to the cathode without producing electricity) is high. Moreover, when the polymer electrolyte membrane is assembled to form a fuel cell, it may be easily bent due to its poor mechanical properties. Accordingly, it is difficult to manufacture a fuel cell using a polymer electrolyte membrane.

In order to address these problems, a method of preparing an organic-inorganic hybrid material by cross-linking a precursor that is an organosilicon compound having a mesogenic group (U.S. Patent Application Publication No. 2005-100772), a method of preparing a polymer electrolyte membrane containing both a fluorinated polymer and a nonfluorinated polymer (U.S. Patent Application Publication No. 2004-0241519), and a method of preparing a polymer electrolyte membrane by swelling a fluorinated ionomer with an organic solvent, removing the used organic solvent, and adding a vinyl monomer, an inhibitor, and various additives to the swollen fluorinated ionomer fluoride (U.S. Pat. No. 4,200, 538) have been suggested.

However, all of these conventional techniques described above have not effectively suppressed the crossover phenomenon in a fuel cell.

SUMMARY OF THE INVENTION

Aspects of the present invention provide a polymer membrane capable of effectively suppressing a crossover phenomenon in a fuel cell, a method of preparing the same, and a fuel cell including the fuel cell.

According to an aspect of the present invention, there is provided a polymer membrane including: a porous polymer matrix; and an acryl-based polymer infiltrated in the porous polymer matrix.

According to another aspect of the present invention, there is provided a method of preparing a polymer membrane, the method including: preparing a porous polymer matrix; mixing an acryl polyol and a hardener with a solvent to prepare an infiltration solution; infiltrating the porous polymer matrix with the infiltration solution; and heating the infiltrated product to remove the solvent and to harden the infiltration solution.

According to yet another aspect of the present invention, there is provided a fuel cell including: a cathode; an anode; and the above-described polymer membrane interposed between the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
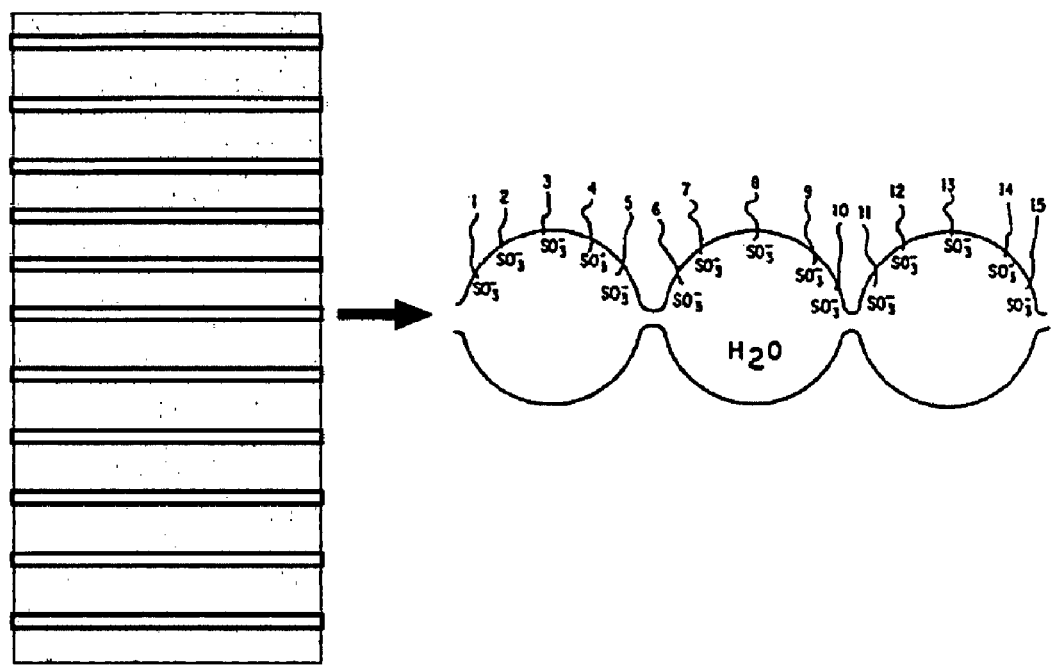
FIG. 1A is a schematic view of a conventional porous polymer matrix which is not infiltrated with an acryl-based polymer.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A polymer membrane according to an embodiment of the present invention includes a porous polymer matrix and an acryl-based polymer infiltrated in the porous polymer matrix.

In general, as a polymer electrolytic membrane of a fuel cell, a sulfonated perfluoro polymer having excellent chemical stability and conductivity (for example: NAFION produced by Dupont) may be used. However, the sulfonated perfluoro polymer membrane has large pores within an ionomer cluster so that the crossover rate of fuel is high and the sulfonated perfluoro polymer membrane is easily bent when a fuel cell is assembled.

Accordingly, in order to address the problems of a conventional polymer electrolyte membrane, an aspect of the present invention relates to infiltrating an acryl-based polymer into pores of a porous polymer matrix to decrease the crossover phenomenon and increase the mechanical strength of the electrolyte membrane.

Figure 1B:
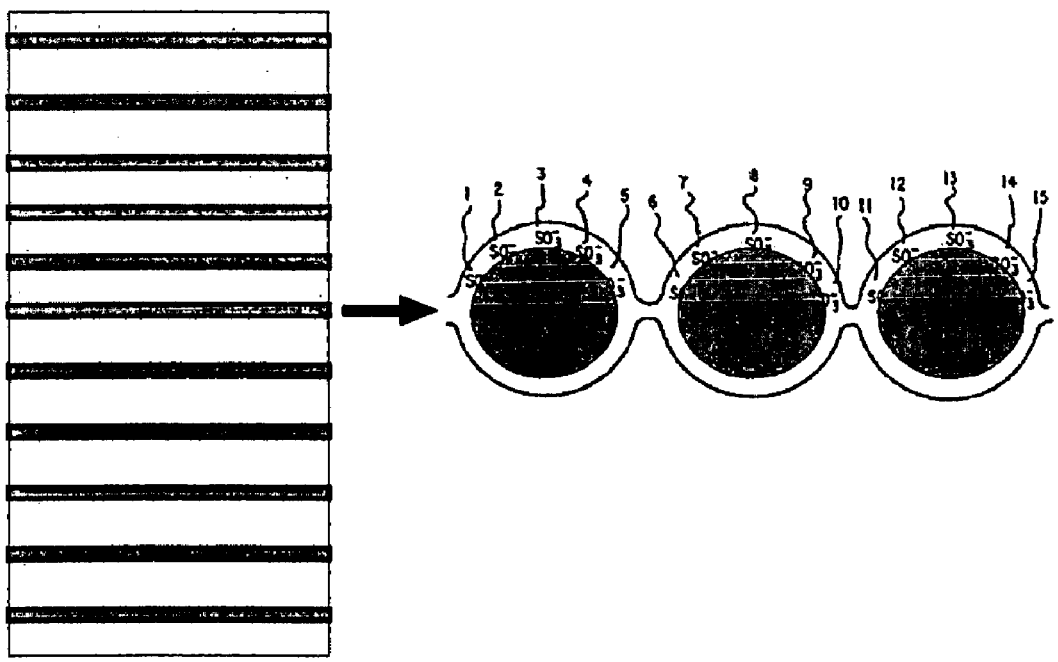
FIG. 1B is a schematic view of a porous polymer matrix according to an embodiment of the present invention that is infiltrated with an acryl-based polymer.

FIG. 1A is a schematic view of a conventional porous polymer matrix into which no acryl-based polymer is infiltrated, and FIG. 1B is a schematic view of a porous polymer matrix according to an embodiment of the present invention into which an acryl-based polymer is infiltrated. In the particular examples depicted in FIGS. 1A and 1B, the porous polymer matrix is a sulfonated porous polymer matrix including $SO_3^-$ groups indicated by reference characters 1 through 15.;

Referring to FIG. 1B, pores of the porous polymer matrix according to an embodiment of the present invention are filled with an acryl-based polymer.

For example, the porous polymer matrix may be a fluoride-containing, hydrocarbon-based polymer that forms an ion channel. More particularly, as non-limiting examples, the porous polymer matrix may be selected from a sulfonated perfluoro polymer, sulfonated polysulfone, sulfonated polystyrene, sulfonated polyetheretherketone, and a polydimethylsiloxane-block-copolymer (PDMS).

As used herein, the term "acryl-based polymer" is used in its commonly understood meaning to refer to a polymer or copolymer formed with monomers including substituted or unsubstituted acrylic acid monomers, although other monomers may be present. For example, the acryl-based polymer may be formed through a hardening reaction between an acryl polyol and a hardener.

The acryl polyol that can be used in the hardening reaction may include at least one acryl polyol formed with monomers selected from the group consisting of methyl methacrylate, butyl acrylate, ethyl acrylate, butyl methacrylate, ethyl methacrylate, methacrylic acid, and acrylic acid, or combinations thereof, all of which have a hydroxyl group (—OH). However, the acryl polyol is not limited thereto.

The hardener may include at least one compound containing an isocyanate group. Specific examples of the hardener include at least one of hexamethylene diisocyanate, toluene diisocyanate, methylene diphenyl diisocyanate, phenylene diisocyanate, naphthalene diisocyanate, and isophorone diisocyanate. However, the hardener is not limited thereto.

For example, when an acryl-based polymer is formed by a hardening reaction of acryl polyol and diisocyanate, the formed acryl-based polymer may have a urethane bond. In particular, when the ratio of isocyanate groups to —OH groups is 2, an acryl-based polymer having a urethane bond can be formed through Reaction Scheme 1:

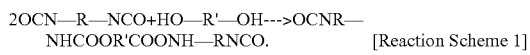

2OCN—R—NCO+HO—R'—OH--->OCNR— NHCOOR'COONH—RNCO.          [Reaction Scheme 1]

Accordingly, in the hardening reaction of acryl polyol and a hardener, the ratio of the isocyanate groups to —OH groups can be in the range of 3 to 0.1.

By the hardening reaction, the porous polymer matrix is infiltrated with the acryl-based polymer, and thus, the result of the hardening reaction is to produce a polymer membrane that has smaller ion channels. As a result, the crossover of fuel may decrease and mechanical strength of the polymer membrane may increase.

In the final polymer membrane, the amount of the acryl-based polymer may be in the range of 0.1-5 parts by weight based on 100 parts by weight of the porous polymer matrix.

As a non-limiting example, the polymer membrane prepared as described above may have an ion conductivity of $10^{-4}$ S/cm–0.1 S/cm.

A method of preparing a polymer membrane according to an embodiment of the present invention includes: preparing a porous polymer matrix; mixing an acryl polyol and a hardener with a solvent to prepare an infiltration solution; infiltrating the porous polymer matrix with the infiltration solution; and heating the infiltrated porous polymer matrix to remove the solvent and to harden the infiltration solution.

As non-limiting examples, the solvent may be 1-propanol, isopropanol, methanol, ethanol, methyl ethyl ketone, toluene, dimethylformamide, dimethylacetamide, dimethyl sulfoxide, 1-methyl-2-pyrrolidone, tetrahydrofuran, or a mixture of thereof.

The porous polymer matrix, the acryl polyol, and the hardener are already described above. In the preparing the infiltration solution, the amount of the acryl polyol may be in the range of 0.01-7.5 parts by weight, and the amount of the hardener may be in the range of 0.002-1.5 parts by weight, based on 100 parts by weight of the solvent. When the amount of the acryl polyol is less than 0.01 parts by weight, the ion cluster is insufficiently filled, and thus, the crossover of methanol does not decrease. On the other hand, when the amount of the acryl polyol is greater than 7.5 parts by weight, acrylpolyol covers the entire external surface of the matrix and the ion conductivity decreases. When the amount of the hardener is less than 0.002 parts by weight, the degree of crosslinking of the acryl polyol is low. On the other hand, when the amount of the hardener is greater than 1.5 parts by weight, unreacted hardener that does not take part in the crosslinking reaction remains present.

The solid content of the acryl polyol may be in the range of 10-100 wt %, and the solid content of the hardener may be in the range of 10-100 wt %. When the solid contents of the acryl polyol and the hardener do not lie in the above ranges, it is difficult to control the ratio of the solvent in the infiltration solution.

The ratio of the solid content of the hardener to the solid content of the acryl polyol is in the range of 0.1-1. When the ratio of the solid content of the hardener to the solid content of the acryl polyol is greater than the upper limit of the range, unreacted hardener that does not take part in the crosslinking reaction may be present. On the other hand, when the ratio of the solid content of the hardener to the solid content of the acryl polyol is less than the lower limit of the range, the degree of crosslinking of the acryl polyol is low.

Subsequently, the porous polymer matrix is infiltrated with the infiltration solution prepared described above. The infiltration time may be in the range of 10 minutes-24 hours.

Finally, the porous polymer matrix infiltrated with the acryl-based polymer is heated to remove the solvent and to harden the infiltration solution. As a result, a polymer membrane according to an embodiment of the present invention can be obtained.

The heating may be performed at 60° C.-150° C. for 3 minutes-24 hours.

A fuel cell according to an embodiment of the present invention may include a cathode, an anode, and a polymer membrane interposed between the cathode and the anode.

The present invention will be described in further detail with reference to the following examples. These examples are for illustrative purposes only and are not intended to limit the scope of the present invention.

EXAMPLES 1-3

NAFION 115 (manufactured by DuPont), which is a sulfonated perfluoro polymer, was used as a porous polymer matrix. Infiltration solutions were prepared, each of which included acryl polyol (AA-916-40, produced by Aekyung Chemical Co., Ltd.), a solvent (1-propanol), and an isocyanate hardener (DN980S, produced by Aekyung Chemical Co., Ltd.) in amounts shown in Table 1. NAFION 115 was infiltrated with each of the infiltration solutions prepared above for 10 minutes-24 hours, and then the infiltration result was heated at 60° C.-150° C. for 3 minutes-24 hours to remove the solvent and to be hardened, thereby preparing a polymer membrane.

TABLE 1

|  | Amount (g) | Ratio of Solid (%) | Amount of Solid (g) | Ratio of Acrylpolyol/ Hardener |
|---|---|---|---|---|
| Example 1 |  |  |  |  |
| Acrylpolyol (AA-916-40) | 8.00 | 40.0 | 3.2 |  |
| Solvent (1-propanol) | 400.00 | 0.00 | 0.00 |  |
| Hardener (DN980S) | 0.80 | 100 | 0.80 |  |
| Total | 408.80 | 1.0 | 4.00 | 10.00 |
| Example 2 |  |  |  |  |
| Acrylpolyol (AA-916-40) | 0.80 | 40.0 | 0.32 |  |
| Solvent (1-propanol) | 400.00 | 0.00 | 0.00 |  |
| Hardener (DN980S) | 0.08 | 100 | 0.08 |  |
| Total | 400.88 | 0.1 | 0.40 | 10.00 |
| Example 3 |  |  |  |  |
| Acrylpolyol (AA-916-40) | 17.00 | 40.0 | 6.80 |  |
| Solvent (1-propanol) | 150.00 | 0.00 | 0.00 |  |
| Hardener (DN980S) | 1.70 | 100 | 1.70 |  |
| Total | 168.70 | 5.0 | 8.50 | 10.00 |

Figure 2:
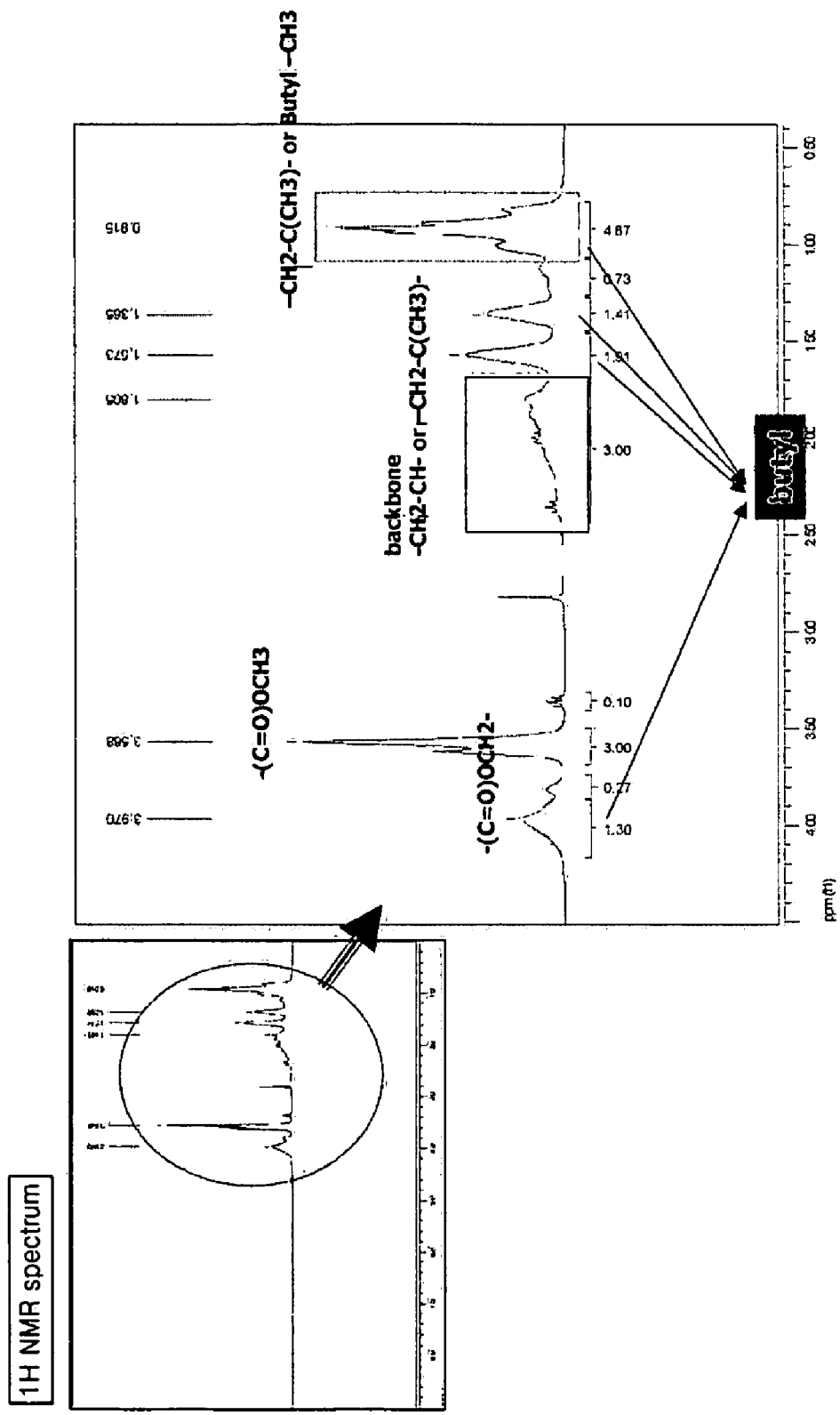
FIG. 2 shows the 1H NMR spectra of a polymer membrane according to an embodiment of the present invention.

FIG. 2 shows the $^1$H NMR spectra of the polymer membrane as prepared above.

Figure 3A:
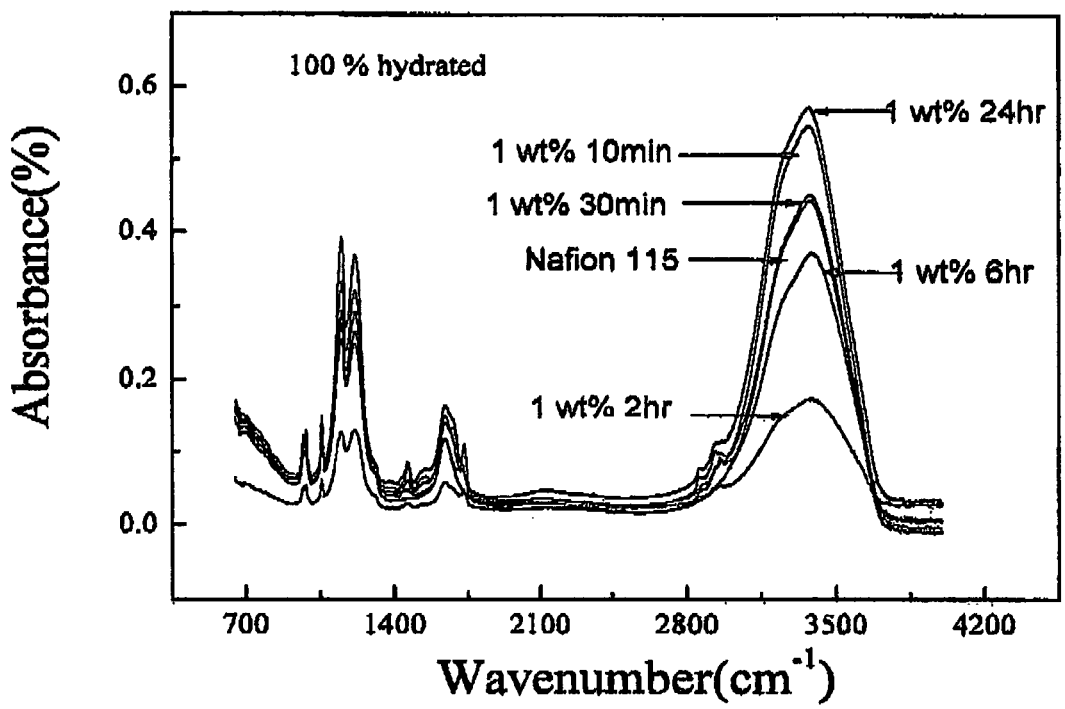
FIG. 3A is a graph of absorbance with respect to wavelength of a polymer membrane including an infiltrated acryl-based polymer according to an embodiment of the present invention.
Figure 3B:
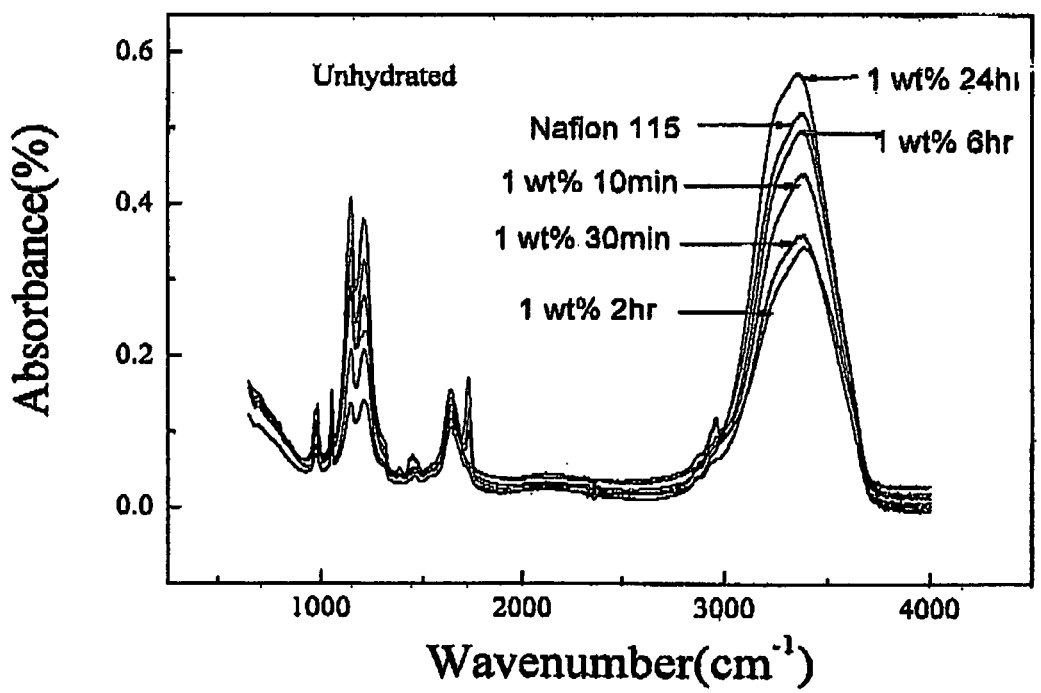
FIG. 3B is a graph of absorbance with respect to wavelength of a conventional polymer membrane.

FIG. 3A is a graph of absorbance with respect to wavelength of a polymer membrane according to Example 1 when the infiltration time was 10 minutes, 30 minutes, 2 hours, 6 hours, and 24 hours. FIG. 3B is a graph of absorbance with respect to wavelength of a conventional polymer membrane.

Figure 4A:
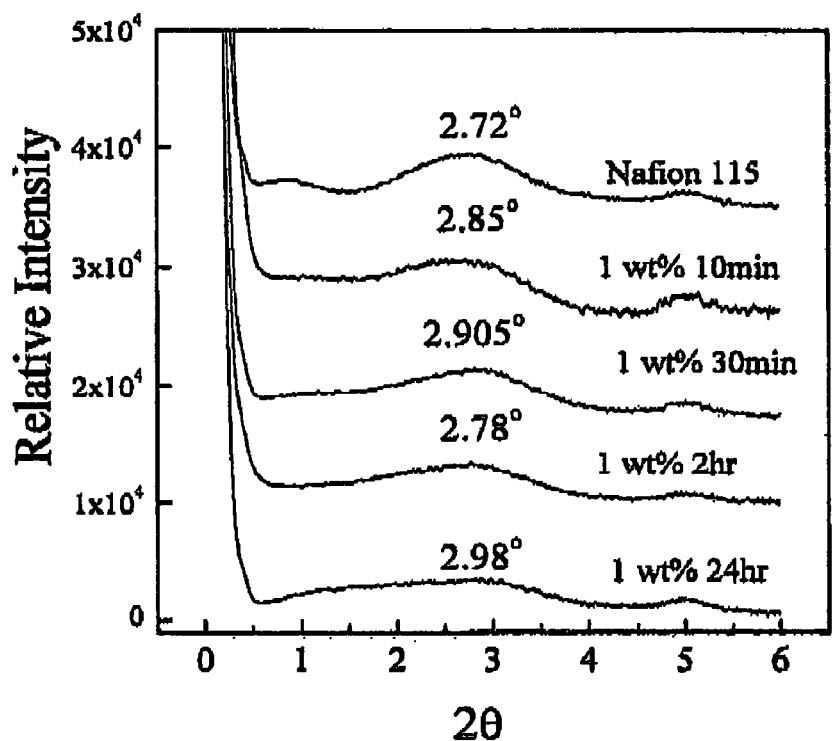
FIGS. 4A and 4B are graphs of X-ray diffraction analysis results of a polymer membrane according to an embodiment of the present invention.
Figure 4B:
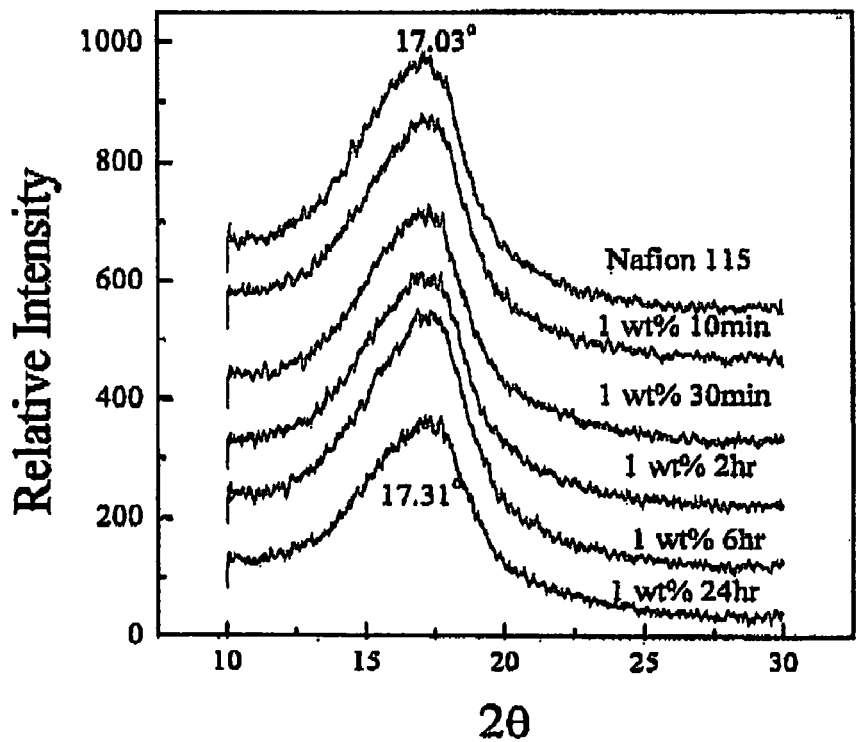

FIGS. 4A and 4B show results of X-ray diffraction analysis of a polymer membrane prepared according to Example 1 (FIG. 4A: 2θ was set in the range of 0-6, and FIG. 4B: 2θ was set in the range of 10-30).

Performance Test 1. Ion Conductivity

Ion conductivities of the polymer membranes prepared according to Examples 1 and 2 were respectively measured using a 2-point probe apparatus in which a contact area of a polymer membrane and an electrode was 1 cm$^2$. Table 2 shows ion conductivity with respect to infiltration time.

TABLE 2

| Polymer membrane | Infiltration Time | Weight before Infiltration (g) | Weight after Infiltration (g) | Ab- sorbance of Acryl (%) | Ion conductivity (S/cm) (12 hours washing) |
|---|---|---|---|---|---|
| Example 1 | 10 min. | 1.248 | 1.2587 | 0.9 | 1.98E−02 |
|  | 30 min. | 1.31 | 1.3339 | 1.8 | 1.27E−02 |
|  | 2 hours | 1.32 | 1.3517 | 2.4 | 1.27E−02 |
|  | 6 hours | 1.3449 | 1.3839 | 2.9 | 1.06E−02 |
|  | 24 hours | 0.7163 | 0.7387 | 3.1 | 4.32E−03 |
| Example 2 | 10 min. | 1.3674 | 1.3715 | 0.3 | 1.16E−02 |
|  | 30 min. | 1.3585 | 1.3659 | 0.5 | 3.77E−03 |
|  | 2 hours | 1.3046 | 1.3194 | 1.1 | 4.07E−03 |

TABLE 2-continued

| Polymer membrane | Infiltration Time | Weight before Infiltration (g) | Weight after Infiltration (g) | Absorbance of Acryl (%) | Ion conductivity (S/cm) (12 hours washing) |
|---|---|---|---|---|---|
| | 6 hours | 1.4 | 1.4283 | 2.0 | 2.42E−03 |
| | 24 hours | 0.798 | 0.8173 | 2.4 | 4.27E−03 |

(Ion conductivity of pure NAFION 115: 2.7E-2 S/cm)

Referring to Table 2, as the infiltration time increases, the absorbance rate of acryl increases and ion conductivity decreases.

Performance Test 2. Crossover of Methanol

| Concentration of Infiltration Solution (wt %) | Infiltration time | Thickness of Dry Film (μm) | $H_2O$ | | $H_2O$:methanol = 1:1 (mol) | |
|---|---|---|---|---|---|---|
| | | | Thickness (μm) | Expansion Ratio (%) | Thickness (μm) | Expansion Ratio (%) |
| 1 | 10 min. | 137.0 | 155.0 | 13.1 | 177.0 | 29.2 |
| | 30 min. | 141.0 | 156.0 | 10.6 | 180.0 | 27.7 |
| | 2 hours | 141.0 | 156.0 | 10.6 | 180.0 | 27.7 |
| | 6 hours | 137.0 | 149.0 | 8.8 | 175.0 | 27.7 |
| | 24 hours | 145.0 | 162.0 | 11.7 | 183.0 | 26.2 |
| 0.1 | 10 min. | 138.0 | 158.0 | 14.5 | 181.0 | 31.2 |
| | 30 min. | 147.0 | 155.0 | 5.4 | 178.0 | 21.1 |
| | 2 hours | 146.0 | 156.0 | 6.8 | 178.0 | 21.9 |
| | 6 hours | 143.0 | 163.0 | 14.0 | 185.0 | 29.4 |
| | 24 hours | 146.0 | 170.0 | 16.4 | 192.0 | 31.5 |
| 0 | — | | NAFION 115 | 17 | NAFION 115 | 39 |

Fuel cells were manufactured using the polymer membranes prepared according to Examples 1 and 2 and NAFION 115 as electrolyte membranes. Methanol crossover of each fuel cell was measured. The results are shown in Table 4.

Referring to Table 4, a polymer membrane according to an embodiment of the present invention showed lower expansion rate than a conventional polymer membrane, and thus decreases methanol crossover.

Figure 5:
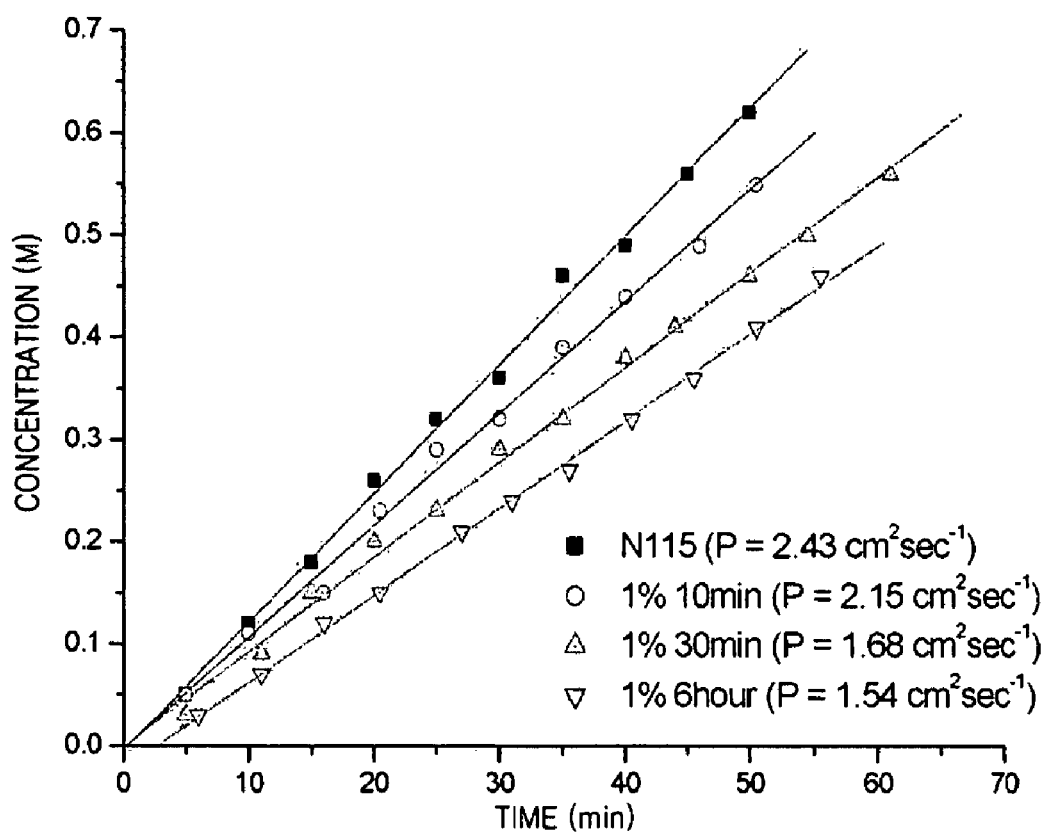
FIG. 5 is a graph of methanol crossover with respect to infiltration time of polymer membranes including infiltrated acryl-based polymer according to an embodiment of the present invention.

FIG. 5 is a graph of methanol crossover with respect to time of polymer membranes prepared using different acryl-based polymer infiltration time periods. Referring to FIG. 5, as infiltration time increases, the methanol crossover decreases. In FIG. 5, the value of P is the value of methanol permeability value ($\times 10^6$).

Figure 6:
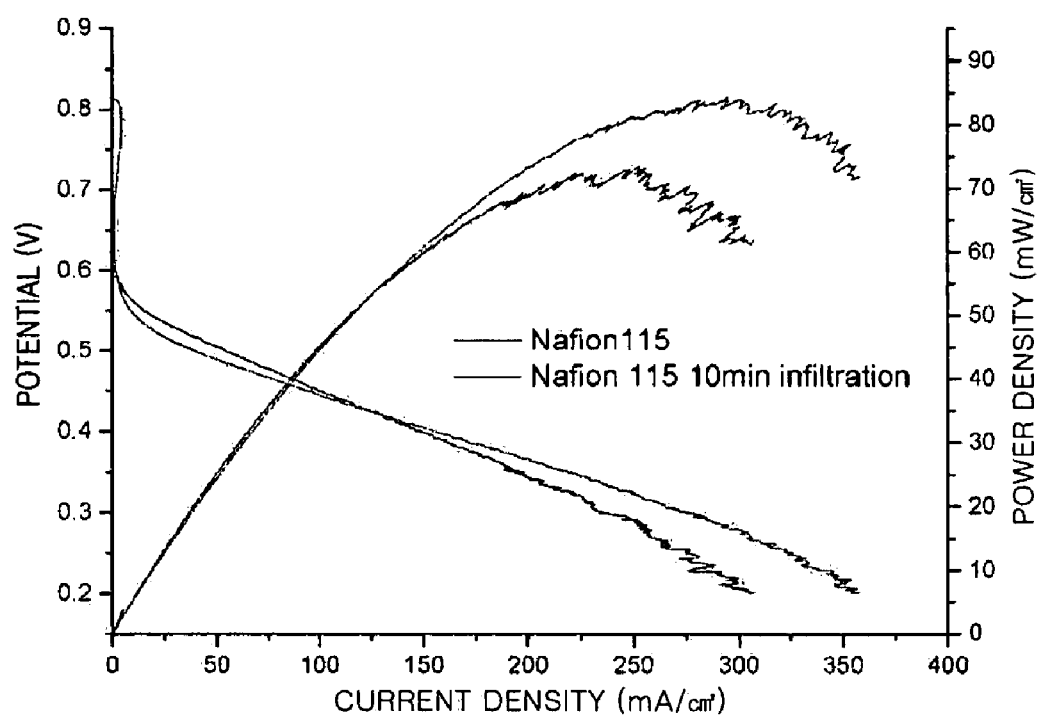
FIG. 6 is a graph of potential and power density with respect to current density of polymer membranes according to an embodiment of the present invention and a conventional polymer membrane.

FIG. 6 is a graph of potential and power density with respect to current density of the polymer membrane according to an embodiment of the present invention and a conventional polymer membrane. The polymer membrane including acryl polyol infiltrated showed better current properties than a pure NAFION 115 when the voltage is 0.4 V or higher at which small current is generated.

A polymer membrane according to an aspect of the present invention can effectively decrease the crossover phenomenon of a fuel cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer membrane comprising:
   a porous polymer matrix, wherein the porous polymer matrix is selected from the group consisting of a sulfonated perfluoro polymer, sulfonated polysulfone, sulfonated polystyrene, sulfonated polyetheretherketone, and a polydimethylsiloxane-block-copolymer (PDMS); and
   an acryl-based polymer infiltrated in pores of the porous polymer matrix,
   wherein the acryl-based polymer is a reaction product of a hardening reaction between an acryl polyol and a hardener.

2. The polymer membrane of claim 1, wherein the acryl polyol comprises at least one acryl polyol formed from monomers selected from the group consisting of methyl methacrylate, butyl acrylate, ethyl acrylate, butyl methacrylate, ethyl methacrylate, methacrylic acid, acrylic acid and combinations thereof.

3. The polymer membrane of claim 1, wherein the hardener comprises at least one hardener selected from the group consisting of hexamethylene diisocyanate, toluene diisocyanate, methylene diphenyl diisocyanate, phenylene diisocyanate, naphthalene diisocyanate, and isophorone diisocyanate.

4. The polymer membrane of claim 1, wherein the hardener comprises at least one compound having at least one isocyanate group and wherein, in the hardening reaction between the acryl polyol and the hardener, the ratio of isocyanate groups to hydroxyl groups (—OH) is in the range of 3 to 0.1.

5. The polymer membrane of claim 1, wherein the amount of acryl-based polymer is an effective amount to decrease methanol crossover through the polymer membrane and to increase the mechanical strength of the polymer membrane.

6. The polymer membrane of claim 1, wherein the amount of the acryl-based polymer is in the range of 0.1-5 parts by weight based on 100 parts by weight of the porous polymer matrix.

7. The polymer membrane of claim 1, wherein the polymer membrane has an ion conductivity of $10^{-4}$ S/cm–0.1 S/cm.

8. A method of preparing a polymer membrane, the method comprising:
   mixing an acryl polyol and a hardener with a solvent to prepare an infiltration solution;
   infiltrating a porous polymer matrix with the infiltration solution, wherein the porous polymer matrix is selected from the group consisting of a sulfonated perfluoro polymer, sulfonated polysulfone, sulfonated polystyrene, sulfonated polyetheretherketone, and a polydimethylsiloxane-block-copolymer (PDMS); and heating the infiltrated porous polymer matrix to remove the solvent and to harden the infiltration solution.

9. The method of claim 8, wherein the solvent is selected from the group consisting of 1-propanol, isopropanol, methanol, ethanol, methyl ethyl ketone, toluene, dimethylformamide, dimethylacetamide, dimethyl sulfoxide, 1-methyl-2-pyrrolidone, tetrahydrofurane, and a mixture of these.

10. The method of claim 8, wherein the acryl polyol comprises at least one acryl polyol formed from monomers selected from the group consisting of methyl methacrylate, butyl acrylate, ethyl acrylate, butyl methacrylate, ethyl methacrylate, methacrylic acid, acrylic acid and combinations thereof.

11. The method of claim 8, wherein the hardener comprises at least one hardener selected from the group consisting of hexamethylene diisocyanate, toluene diisocyanate, methylene diphenyl diisocyanate, phenylene diisocyanate, naphthalene diisocyanate, and isophorone diisocyanate.

12. The method of claim 8, wherein the amount of the acryl polyol is in the range of 0.01-7.5 parts by weight and the amount of the hardener is in the range of 0.002-1.5 parts by weight, based on 100 parts by weight of the solvent.

13. The method of claim 12, wherein the ratio of the solid content of the hardener to the solid content of the acryl polyol is in the range of 0.1-1.

14. The method of claim 8, wherein the acryl polyol has a solid content in the range of 10-100 wt%, and the hardener has a solid content in the range of 10-100 wt %.

15. The method of claim 8, wherein the ratio of the solid content of the hardener to the solid content of the acryl polyol is in the range of 0.1-1.

16. The method of claim 8, wherein the infiltration time is in the range of 10 minutes-24 hours.

17. The method of claim 8, wherein the heating is performed at 60° C.-150° C. for 3 minutes-24 hours.

18. A fuel cell comprising:
a cathode comprising a catalyst that promotes reduction of oxygen;
an anode comprising a catalyst that promotes an oxidation of a fuel; and
the polymer membrane of claim 1 interposed between the cathode and the anode.

19. A fuel cell comprising:
a cathode comprising a catalyst that promotes a reduction of oxygen;
an anode comprising a catalyst that promotes an oxidation of a fuel; and
a polymer membrane interposed between the cathode and the anode, the polymer membrane comprising:
a porous polymer matrix, wherein the porous polymer matrix is selected from the group consisting of a sulfonated perfluoro polymer, sulfonated polysulfone, sulfonated polystyrene, sulfonated polyetheretherketone, and a polydimethylsiloxane-block-copolymer (PDMS); and
an acryl-based polymer infiltrated in pores of the porous polymer matrix.

* * * * *

UNITED STATES PATENT AND TRADEMARK OFFICE
CERTIFICATE OF CORRECTION

PATENT NO. : 7,592,086 B2
APPLICATION NO. : 11/443161
DATED : September 22, 2009
INVENTOR(S) : Yeong-suk Choi et al.

It is certified that error appears in the above-identified patent and that said Letters Patent is hereby corrected as shown below:

Column 9, line 31, change "10-1 00wt%" to --10-100wt%--.

Signed and Sealed this

Twenty-second Day of December, 2009

David J. Kappos
*Director of the United States Patent and Trademark Office*